Dec. 1, 1931.    V. E. CARBONARA    1,834,017
OPTICAL INSTRUMENT
Filed Dec. 18, 1928    2 Sheets-Sheet 1
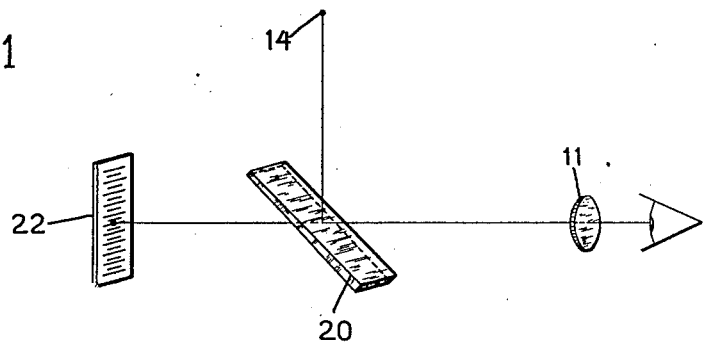
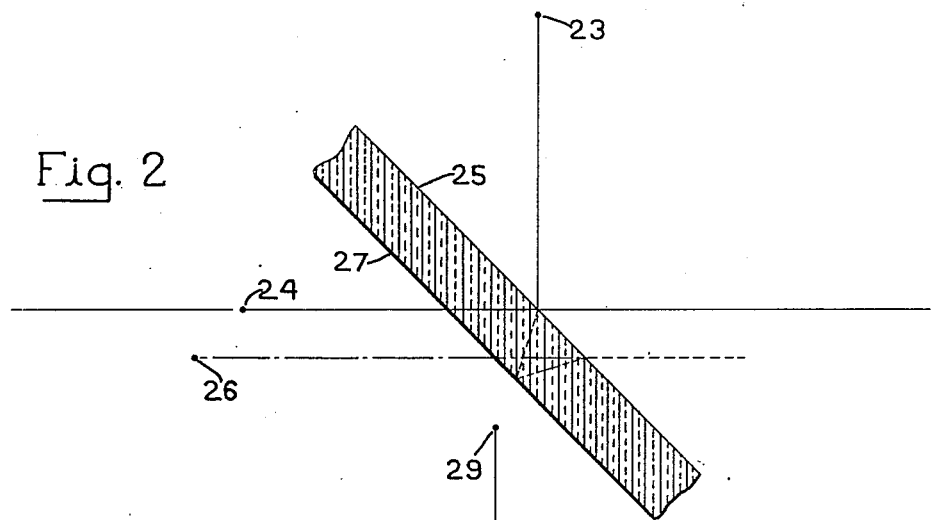
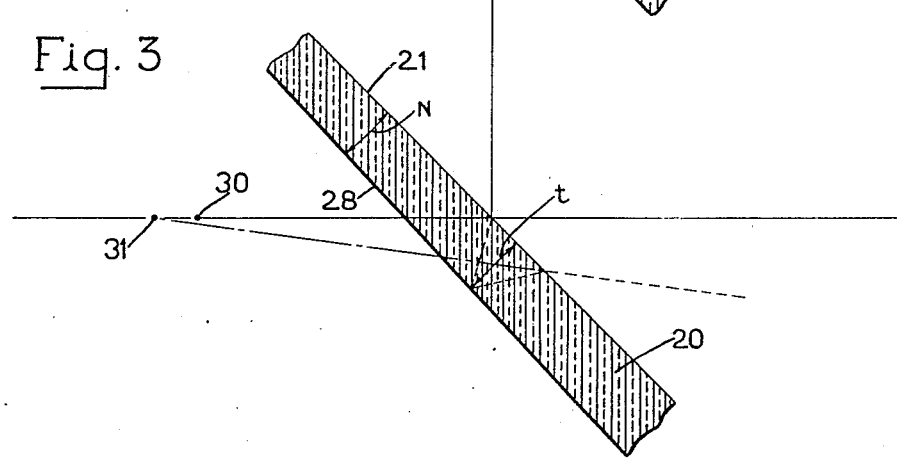

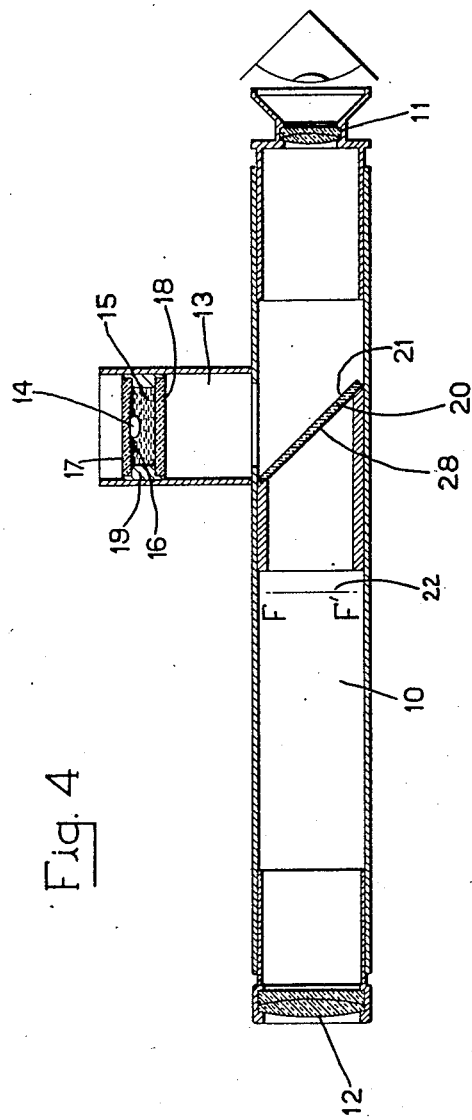

Patented Dec. 1, 1931

1,834,017

UNITED STATES PATENT OFFICE

VICTOR E. CARBONARA, OF BROOKLYN, NEW YORK, ASSIGNOR TO PIONEER INSTRUMENT COMPANY, INCORPORATED, OF BROOKLYN, NEW YORK, A CORPORATION OF NEW YORK

OPTICAL INSTRUMENT

Application filed December 18, 1928. Serial No. 326,810.

This invention relates to optical instruments for determining the horizontal direction in relation to a point of observation, and also relates to optical instruments by which the angle of elevation or of depression of a distant object may be measured. More particularly this invention relates to improvements in that form of telescope which has a liquid-level as a component part of its optical system and in which the image of a bubble of the liquid-level constitutes a fiducial point which may be correlated to or compared with a reference line or point whereby a determination is enabled of the horizontal direction or of the angle which the telescope and the line of observation makes with the horizontal direction.

In a telescope of the class in which a liquid-level is a part of the optical system, the liquid-level is usually placed to one side of the axis of collimation of the telescope and a reflector is so positioned as to produce a virtual image of the bubble in the image or reference plane along the axis of collimation or line of observation. A common form of reflector constitutes a piece of glass with parallel surfaces placed across the line of observation and at an angle of forty-five degrees to the line of observation. In order to avoid a double image such a reflector may be lightly silvered or have half of its surface silvered, but either expedient shuts out a large portion of the light which enters the telescope at its objective lens end. This results in dimming the view had of the distant object being observed and also renders the reference plane indistinct.

Among the objects of this invention is to provide a telescope of the class referred to with which but one virtual image of the bubble of the liquid-level is observable.

Another object of the invention is to provide reflecting optical means through which the field of view and the image reference plane is clearly visible.

Another object of the invention is to provide reflecting optical means which does not operate to shut out any appreciable amount of the light entering the telescope through its objective lens.

Another object of the invention is to provide a telescope which may be used for obtaining a trustworthy indication of the horizontal direction without any special knowledge and without resort to involved corrective manipulations or observations.

Other objects of my invention will be set forth hereinafter and, for a complete understanding of the principle of my invention, reference may be had to the drawings in which:

Fig. 1 illustrates generally the relation of the bubble of the liquid-level and its virtual image as viewed through an eyepiece.

Fig. 2 diagrammatically represents on a large scale the double image visible when the reflector has parallel plane faces.

Fig. 3 diagrammatically represents on a large scale, in accordance with the principle of my invention, the manner in which a secondary virtual image is placed behind the brighter of the virtual images.

Fig. 4 illustrates one form of practical embodiment of the invention.

The simple form of telescope illustrated in Fig. 4 has a sight tube 10 with an adjustable eyepiece 11 at one end and an objective lens system 12 at the other end. 13 is a branch tube which extends perpendicularly from the sight tube 10 and communicates therewith by an opening through which light may pass. Within branch tube 13 there is disposed a liquid-level formed by a bubble 14 which, together with a liquid 15, is enclosed within the level. The bubble 14 contacts the concave surface 16 of a glass 17, and the liquid 15, which preferably may be the petroleum derivative xylol, is confined by glass 17, 18 and annulus 19 to which the glasses are cemented. The concave surface 16 is a segment of a sphere which preferably has a radius of curvature commensurate with the focal length of the objective lens system 12. Glasses 17 and 18 are preferably transparent so that a maximum of light may be permitted to pass through the bubble 14. The arrangement of the level is such that the center of the bubble will be intersected by a line perpendicular to the axis of the sight tube 10, which axis is the line of observation or the axis of collimation of the telescope, when such axis lies in an horizontal direction.

Immediately beyond the end of branch tube 13 and within sight tube 10 there is disposed a mirror or reflector 20 whose front face 21 lies in a plane at an angle of forty-five degrees with the line of observation. The height of bubble 14 above the axis of the sight tube is such that the virtual image of the bubble produced by reflection from front face 21 will be in the image plane of the objective lens system 12. Accordingly, the image of the distant object being observed and the virtual image of the bubble, which constitutes a fiducial point, are juxtaposed in the same plane of reference. The position of the reference plane is illustrated at F—F on Fig. 4. The fiducial point appears as a small round image formed by a pencil of light passing through the center of the bubble. As is well understood, when the virtual image of bubble 14 is seen at the central portion of plane F—F, which is intersected by the axis of the line of observation through tube 10, the line of observation is in an horizontal direction. For definite reference, a transparent reference plate or screen 22, Fig. 1, having graduations thereon may be placed at F—F. A properly selected plate or screen 22 may serve to render visible the image of the distant object being observed. In order to render possible the direct reading of the angle which the line of sight makes with the horizontal direction when observations are being made on a distant object, the graduations may be identified by numerical designations of angular measurement.

When a mirror or reflector which consists of a transparent glass having parallel polished plane faces is observed at an angle to the line of observation and at an angle to an object point 23, Fig. 2, a multiplicity of images of the object point will be seen. In Fig. 2, the relation of two such virtual images are illustrated, image 24 which is produced by direct reflection from front surface 25 and image 26 which is produced by reflection from rear surface 27. Image 26 is less clear than image 24 but its presence is confusing and it would affect the reliability of an optical instrument of the present type.

In order to reduce the confusing effect caused by secondary images in such reflectors, resort has been had to the expedient of lightly silvering the entire surface of the mirror. The effect produced is not entirely satisfactory for a clear view of the reference plane at F—F may not be had. Silvering or rendering substantially opaque the lower half of the mirror serves to eliminate the undesirable double images, but it also shuts off half of the sight tube and reduces the field of view.

In order to produce a telescope of the class referred to and which does not obstruct nor dim the view to be had while observing a distant object I use a transparent mirror 20 having non-parallel polished plane faces 21, 28. The front face 21 of such a mirror is disposed at an angle of forty-five degrees with the line of sight, and the virtual image of an index point 29 appears to be at 30, Fig. 3. The angular relation of the front face 21 to the rear face 28 is such that the secondary virtual image of index point 29 produced by reflection from face 28 appears to be at 31. This latter position is rearward of position 30 and since it is in the line of observation it does not appear as a second image. The luminosity of other secondary images is of such weak strength as to render their adverse effect negligible. The virtual image of the bubble 14 of the liquid-level produced by such a mirror is intensified since the effect of the two virtual images produced by reflection from surfaces 21, 28 is the combined effect of the two images and the fiducial point thus obtained is more distinct than if it were the image of but one reflection.

The angle at which the two faces 21, 28 must be placed is a function of the index of refraction of the transparent medium forming the mirror, of the mean thickness of the mirror, and of the distance of the bubble from the optical axis of the telescope. The mathematical formula expressing the relation of the various functions is as follows:

$$H = 0.7071\, t\,[\tan r + \tan (r+2N)]\\ \cosec\,[\sin^{-1}Q\,\sin\,(r+2N) - 45] - P$$

where
$H$ = the height of the bubble above the optical axis of the telescope,
$t$ = the mean thickness of the mirror,
$Q$ = the index of refraction of the medium forming the mirror,
$N$ = the angle between the front and rear faces of the mirror, and $$P = \frac{t}{Q}[\sec r + \sec (r+2N)]$$

In practice, the angle between the faces of the mirror needs only to approximate the mathematically exact angle, for it is apparent that the height of the bubble may be increased or decreased in order to produce the desired alignment of the virtual images. In a telescope to be used for comparing the fiducial point with the image of a distant object the position of the liquid-level in branch tube 13 may be determined, and then it is only necessary to position the objective lens system 12 so as to juxtapose the virtual image of bubble 14 and the image of the distant object.

The formula set forth hereinbefore is suitable for calculating the correct angle between the plane faces of the mirror, and I have found that it is possible to obtain on the open market suitable weak prisms such as are used by manufacturers of spectacles. However, the angular relation of the faces of such weak prisms has been found to vary for a given number of prisms and therefore I prefer to design the telescope so as to make it possible to move the liquid-level and objective lens system 12 toward or away from the mirror.

While a telescope improved by the use of a weak prism and in accordance with the principle of my invention has many uses it is particularly useful in situations where it is difficult to determine the horizontal direction and for navigation at night or in cloudy weather. Artificial lighting may be used, when necessary to illuminate the bubble of the liquid-level.

What I claim is:

1. In an instrument for determining the horizontal direction in relation to a point of observation, a liquid-level having a bubble, a reference image plane, and means for producing in the image plane an image of the bubble, said means comprising a transparent medium inclined to the line of observation and having oppositely disposed reflecting surfaces inclined to each other at an angle which causes images reflected from the front and rear surfaces to be aligned along the line of observation.

2. In an instrument for determining the horizontal direction in relation to a point of observation, means for forming in a predetermined reference plane an image of a distant object, a liquid-level having a bubble and positioned so that the rays which form an image of the bubble are perpendicular to the line of observation, and transparent optical means for reflecting said rays to produce said bubble image in the same reference plane in which the image of the distant object is produced, said transparent reflecting optical means being positioned at a finite distance from the bubble and in the line of observation of the instrument at a predetermined angle and having non-parallel reflecting surfaces so that but one image of the bubble will be observable in the reference plane and with which the image of the distant object is collimated.

3. In an instrument for determining the horizontal direction in relation to a point of observation, means for producing in a predetermined reference plane an image of a distant object, a liquid-level having a bubble and positioned so that light rays passing through the level which form an image of the bubble are perpendicular to the line of observation, and transparent optical means positioned in the line of observation of the instrument for reflecting said rays to form the image of the bubble, said transparent reflecting optical means being positioned a finite distance from the bubble and having non-parallel plane surfaces which form a predetermined angle therebetween which is a function of the index of refraction of the medium forming said optical means, of the mean thickness of said optical means, and of the distance of the bubble means from the optical axis of the instrument, so that the image of the bubble which is reflected by one of the plane surfaces and the image of the bubble formed by the other plane surface of said optical means will fall on the optical axis of the instrument in juxtaposition to each other, whereby only one image of the bubble will be observable in the predetermined reference plane in which the image of the distinct object is formed.

4. In an instrument for determining the horizontal direction in relation to a point of observation, a reference image plane, means for producing in said reference image plane an image of an object substantially at infinity, means whereby the image of said distant object may be observed, a liquid-level having a bubble and arranged adjacent the optical axis of the instrument in such a position that light rays passing through the liquid-level which form an image of the bubble are at an angle to the optical axis, and means for producing an image of the bubble in said reference plane, said means comprising a transparent reflector positioned at a finite distance from the bubble and having non-parallel reflecting surfaces through which the complete image of the distant object is observable and which render indistinguishable secondary images of the bubble that may be present due to double reflection.

5. In an instrument for determining the horizontal direction in relation to a point of observation, a reference image plane, means for producing in said reference image plane an image of an object substantially at infinity, means whereby the image of said distant object may be observed, a liquid-level having a bubble and arranged adjacent the optical axis of the instrument in such a position that light rays passing through the liquid-level which form an image of the bubble are at an angle to the optical axis, and means for producing an image of the bubble in said reference plane, said means comprising a transparent reflector positioned at a finite distance from the bubble and having a pair of plane surfaces inclined at such an angle to each other as to prevent the production of a visible secondary image of the bubble in said reference plane.

6. In an instrument for determining the horizontal direction in relation to a point of observation, a reference image plane, means for producing in said reference image plane an image of an object substantially at infinity, means whereby the image of said distant object may be observed, a liquid-level having a bubble and arranged adjacent the optical axis of the instrument in such a position that light rays passing through the liquid-level which form an image of the bubble are at an angle to the optical axis, and means for producing an image of the bubble in said reference plane, said means comprising a transparent medium positioned at a finite distance from the bubble and inclined to the line of observation, and also having oppositely disposed reflecting surfaces inclined to each other at an angle which causes images of the bubble reflected from the front and rear surfaces to be aligned along the line of observation, thereby producing a reinforced image of the bubble in the reference plane.

In testimony whereof I hereto affix my signature.

VICTOR E. CARBONARA.